INVENTORS,
ABRAHAM SINGER
ISRAEL S. FRIEDBERG
EINAR NAESS
CLYDE D. HARDIN
BY: Harry M. Saragovitz, Edward J. Kelly,
Herbert Berl &
J. P. Edgerton
ATTORNEYS.

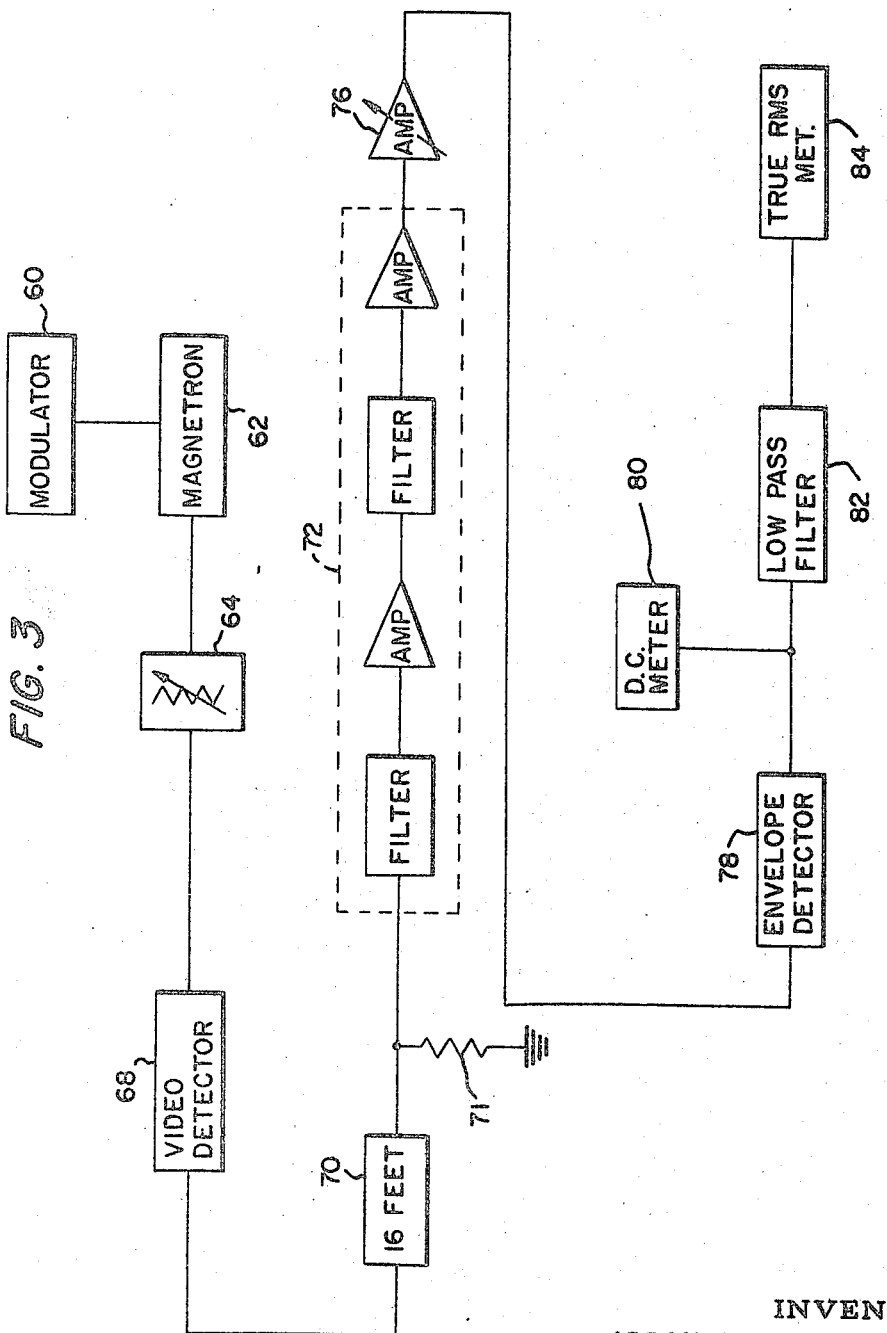

United States Patent Office 3,493,859
Patented Feb. 3, 1970

3,493,859
DEVICE FOR MEASURING PULSE JITTER
Abraham Singer, Silver Spring, Israel S. Friedberg, Potomac, and Clyde D. Hardin, Rockville, Md., and Einar Naess, Kongsberg, Norway, assignors to the United States of America as represented by the Secretary of the Army
Filed Mar. 28, 1968, Ser. No. 716,791
Int. Cl. G01r 23/16
U.S. Cl. 324—77                      7 Claims

ABSTRACT OF THE DISCLOSURE

A quantitative definition of pulse train jitter is developed which shows that pulse train jitter modulates each harmonic of the "mean" pulse train, and that consequently the jitter may be expressed as the ratio of the jitter power, in the AM side bands, associated with a convenient harmonic, to the power in that harmonic. The signal from which jitter is to be measured is passed through a filter which selects a convenient harmonic. The signal is amplified and then passed through an envelope detector which extracts the power of the AM side bands associated with the selected harmonic. Metering systems are provided to measure the power in the AM side bands and the power of the harmonic.

The invention described herein may be manufactured, used, and licensed by or for the Government for governmental purposes without the payment to us of any royalty thereon.

BACKGROUND OF THE INVENTION

Every video or RF pulse train obtained from a physically realizable source contains some systematic or random variations, however small, in pulse repetition-rate, height, and width. These variations are usually referred to as pulse train jitter.

Since the development of video and RF pulse train generators over fifty years ago, the problem has existed that such a source could meet all the military specifications and yet be unusable in a radar system because of excessive pulse train jitter. Because of the relative cumbersomeness of present techniques for measuring pulse jitter, the magnitude of this parameter has been most commonly measured by estimating it on a visual basis. However, such estimates are frequently inadequate in that potentially useful data is not made available because of the subjectivity inherent in the very nature of the measurement.

Previous methods for quantitatively identifying and measuring pulse train jitter are of two kinds. The first method rests on a simplifying assumption about the character of the jitter, which lends itself to analytical treatment. An analysis of this type was performed by G. G. MacFarlane, and presented in "On the Energy-Spectrum of an Almost Periodic Succession of Pulses," Proceedings IRE, pp. 1139–1143, October 1949. MacFarlane assumed that random jitter has a Gaussian probability density function and that the energy density spectrum may be separated into two components spectra as follows:

(a) A line spectrum containing the energy of the unperturbed pulse trains; and (b) A continuous spectrum containing the energy of the perturbations or jitter. The information required for the jitter measurement is contained in the continuous part of the video spectrum. An instrument that operates on the principles developed by MacFarlane is disclosed in a paper by Jessie Taub and Charles I. Smith, "Direct Reading Instrument for the Measurement of RMS Jitter," IRE 1955, Convention Record, part 10. Unfortunately, the system developed by Taub has several disadvantages. The Taub system only measures one type of jitter; pulse width; and his system is not capable of measuring jitter in the pulse repetition rate and in pulse height. Furthermore, in order to achieve an absolute measurement of pulse width jitter Taub amplifies the video pulses and then clips them at some predetermined level. This means that measurements of narrow pulses (e.g. 10 $n$'s in width), are limited by the realizability of extremely wide band amplifiers with flate gain characteristics. Taub estimates the sensitivity of his system as approximately 0.01 micro second of RMS jitter. Additionally, the system developed by Taub must be calibrated by a sinusoidally pulse-width modulated train, whose jitter power is known.

A second method of measuring pulse train jitter is to compare the pulse train with a suitable reference train which is by definition taken as jitter free. This method is more fully described in U.S. Patents Nos. 3,325,730; 3,118,109; and 3,059,179. The most serious shortcoming of this second method is that it provides only a relative definition of jitter and it inherently lacks the means for quantitatively determining how jitter-free the reference is.

It is therefore an object of this invention to provide an instrument for measuring pulse train jitter which will permit an absolute evaluation of jitter and is independent of jitter character, therefore requiring no assumptions or a prior knowledge of the jitter character.

An additional object of this invention is to provide an instrument for measuring pulse train jitter that will lend itself to relatively simple instrumentation and be self-calibrating.

Still yet another object of the invention is to provide an instrument for measuring pulse train jitter that will require little or no video amplification and will have high sensitivity.

Still yet another object of the invention is to provide an instrument for measuring pulse train jitter that will be relatively inexpensive and easy to use.

SUMMARY OF THE INVENTION

A system for measuring the amount of pulse-train jitter that lends itself to simple instrumentation and give a quantitative measurement of every type of jitter including the jitter in pulse repetition rate, width and height. It can be shown that jitter may be expressed as the ratio of the jitter power in the AM sidebands associated with a convenient harmonic to the power in that harmonic. The signal in which the jitter power is to be measured has a convenient harmonic selected and passed through an envelope detector. Before detection, the signal can be amplified when it is too weak for accurate measurement. The detected signal is then measured by a DC meter and a true RMS meter. The pulse-train jitter is shown to be the square of the ratio of the RMS meter reading and the DC meter reading.

BRIEF DESCRIPTION OF THE DRAWINGS

The specific nature of the invention, as well as other objects, aspects, uses and advantages thereof, will clearly appear from the following description and from the accompanying drawing, in which:

FIGURE 3 is a block diagram of another system for measuring pulse-train jitter in accordance with the invention.

DESCRIPTION OF THE PREFERRED EMBODIMENT

(a) A definition of pulse-train jitter

Figure 1:
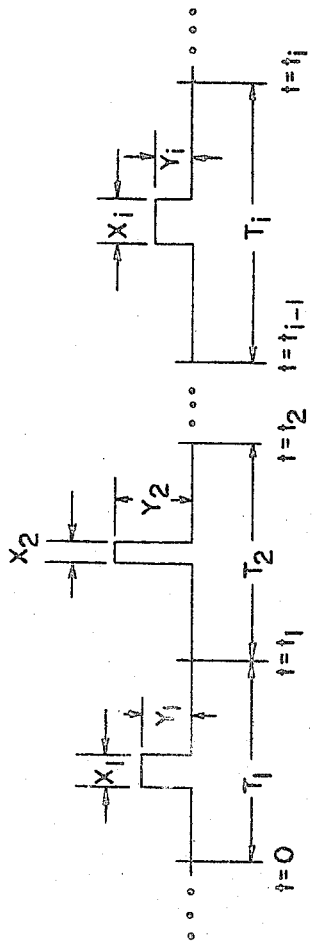
FIGURE 1 is a diagram of a pulse train with jitter exaggerated, used to develop a definition of pulse-train jitter.

FIGURE 1 shows a train of N pulses, $h(t)$, where N is theoretically very large. X, Y and $f_o$ are the mean values of pulse width, amplitude, and repetition rate respectively; $x$, $y$ and $\gamma$ are the respective change in X, Y and $f_o$; and $x_m$, $y_m$ and $\gamma_m$ are the maximum values of $x$, $y$ and $\gamma$. Also, $\delta$ denotes the change in $f_o$ when $x=0$; $\alpha$ is the change in $f_o$ due to $x$ and $\gamma = \delta + \alpha$.

Assume, for the sake of simplicity, that $x_m \ll X$, $y_m \ll Y$, and $\gamma_m \ll f_o$. Let $x$, $y$ and $\gamma$ be (1) random variables having arbitrary density functions, or (2) well behaved periodic functions, or (3) a superposition of (1) and (2).

If we divide the pulse train into N intervals (as shown in FIGURE 1), then we may write $h(t)$ as $$h(t) = \sum_{i=1}^{N} h_i(t) \quad (1)$$

where $h_i(t)$ is equal to the value of $h(t)$ during the interval $\tau_{i-1} \le t \le \tau_i$ and zero elsewhere.

By the Fourier theorem, we can represent $h_i(t)$ as $$h_i(t) = C_i + 2\sum_{n=1}^{\infty} (X+x_i)(Y+y_i)(f_o+\gamma_i)$$
$$\frac{\sin[\pi_n(f_o+\gamma_i)(X+x_i)]}{\pi_n(f_o+\gamma_i)(X+x_i)} \cos 2\pi_n(f_o+\gamma_i)t \quad (2)$$

when
$$\tau_{i-1} < t < \tau_i$$
$$h_i(t) = 0 \text{ elsewhere}$$

where $x_i$, $y_i$ and $\gamma_i$ are particular values of $x$, $y$ and $\gamma$ in the $i^{th}$ interval. Thus, $h(t)$ is simply $$h(t) = C + 2\sum_{i=1}^{N}\sum_{n=1}^{\infty}(X+x_i)(Y+y_i)(f_o+\gamma_i)$$
$$\frac{\sin[\pi_n(f_o+\gamma_i)(X+x_i)]}{\pi_n(f_o+\gamma_i)(X+x_i)} \cos 2\pi_n(f_o+\gamma_i)t \quad (3)$$

In most pulse-radar systems $Xf_o \ll 1$, so that in these cases we can always choose a "Harmonic" $H_r^*(t)$ such that $\pi n_r X f_o \ll 1$. Thus, we may write the first "Harmonic" ($n=1$) of this pulse train as $$H_1^*(t) = 2\sum_{i=1}^{N}(X+x_i)(Y+y_i)(f_o+\gamma_i)\cos 2\pi(f_o+\gamma_i)t \quad (4a)$$

or $$H_1^*(t) 2(X+x)(Y+y)(f_o+\gamma)\cos 2\pi(f_o+\gamma)t \quad (4b)$$

We note in Equation 4b that the FM sidebands reflect only the pulse width and repetition rate jitter while the AM sidebands reflect all three types of pulse-train jitter.

Neglecting all terms of second and higher order, we may write $$H_1 = 2\left(1 + \frac{x}{X} + \frac{y}{Y} + \frac{\gamma}{f_o}\right) XYf_o \cos 2\pi(f_o+\gamma)t \quad (5a)$$

If we choose to measure $H_1$ by instrumentation which is insensitive to the $\gamma$ in the argument of the cosine term of (5) [i.e., the instrumentation bandpass characteristic cannot translate the FM into AM] then we may also write Equation 5a as $$H_1^1(t) = 2\left(1 + \frac{x}{X} + \frac{y}{Y} + \frac{\gamma}{f_o}\right) XYf_o \cos 2\pi f_o t \quad (5b)$$

Let
$$H_1^{11} = 2XYf_o \cos 2\pi f_o t \quad (6a)$$

and $$J = 2\left[\frac{x}{X} + \frac{y}{Y} + \frac{\gamma}{f_o}\right] XYf_o \quad (6b)$$

Using the Weiner-Khintchine theorem, we may write the average power, in a unit resistance, in a bandwidth $\pm f_o/2$ of the variable $J(t)$ as $$P_J = \frac{1}{2\pi}\int_{\pi f_o}^{3\pi f_o} S(W)dw \quad (7)$$

where $S(w)$ is the power spectral density of $J(t)$.

The average power, in a unit resistance, in the unmodulated harmonic $H_1^{11}(t)$ is $$P_i = \frac{1}{\tau}\int_{-T/2}^{+T/2} 2(XYf_o)^2 \cos^2(2\pi f_o t)dt = 2(XYf_o)^2 \quad (8)$$

Equations 7 and 8 lead to the following definitions of pulse-train jitter $$PTJ = \frac{P_J}{P_i} = \frac{\int_{\pi f_o}^{3\pi f_o} S(W)dw}{4\pi(XYf_o)^2} \quad (9)$$

In other words, pulse-train jitter is defined as the ratio of the "jitter" power in the AM side bands, in a bandwidth $f_o$, associated with a convenient harmonic to the power in that harmonic.

(b) Circuit for detecting pulse-train jitter (PTJ)

Figure 2:
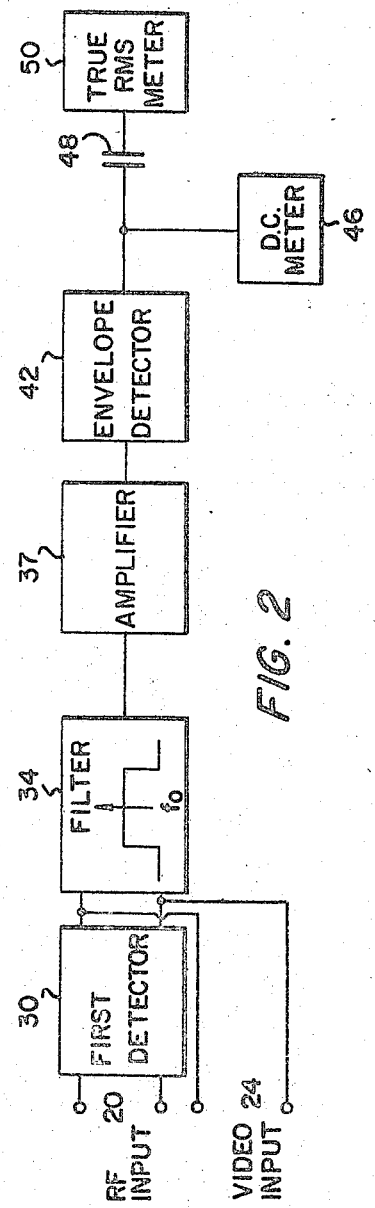
FIGURE 2 is a block diagram of a system for measuring pulse-train jitter in accordance with the invention.

The circuit of FIGURE 2 is an idealized circuit for making PTJ measurements using the definition of Equation 9. There is a video input 24 to the circuit and a RF input 20 which is connected to the measuring circuit through a detector 30. Filter 34 ideally has a center frequency $f_o$ equal to the value of the first harmonic and an adjustable bandwidth whose maximum range is $\pm f_o/2$. The output of filter 34 is amplified by the amplifier 37 which has a bandwidth equal to or wider than the bandwidth of the filter 34. The amplified signal is passed through the envelope detector 42 and DC meter 46 is connected to the output of the envelope detector 42. A true RMS meter 50 is also connected to the output of the envelope detector 42 by means of a DC blocking capacitor 48.

In operation, a signal would be fed into the circuit by either the video input terminals 24 or the RF input terminals 20. The use of the input terminals would be mutually exclusive. The purpose of the detector 30 is to change the RF input into a video signal before it is filtered. Passing the signal through the ideal filter 34 will select the chosen harmonic and the jitter associated with that harmonic. The filtered signal is then amplified in those cases where the signal available does not have sufficient strength to allow easy measurement and detection. In many cases where the signal is sufficiently strong the amplifier will not be necessary. The envelope detector 42 takes the filtered and amplified signal and extracts the power of the AM harmonics which are associated with the frequency line and RMS meter 50 will measure the power in that jitter. The DC meter will measure the peak voltage of the selected frequency line. The pulse-train jitter is simply the square of the ratio of the true RMS meter reading to the DC meter reading.

Using the measuring system described above, tests were conducted on a BL-234C 70-gHz., low field magnetron. The jitter specification on this particular unit defines an acceptable magnetron as one whose total PTJ is less than −37 db. The measurement is to be made when the magnetron is operating at a 10-kHz. repetition rate and a pulse width of 15 n's. FIGURE 3 shows a block diagram of the circuit used to measure the PTJ of the BL–234C. Modulator 60 drives the magnetron 62 whose output is fed through a variable attenuator 64 to a 1N279 diode used as a video detector 68. In order to suppress video pickup it was found necessary to provide a minimum of 16 feet of spatial isolation between the jitter measuring circuit and the modulator. This isolation was obtained by the use of a 16 foot RG–58/u cable (denoted as box 70) terminated in a 50 ohm resistor 71 at the amplifier end of the cable. The bandpass-amplifier or filtering stage of the circuit shown within the line 72 has a 40 kHz. bandpass filter and a 5 kHz. bandwidth. Design considerations account for the use of the several component parts of the filtering stage 72. Amplifier 76 can be any adaptable bandpass amplifier which is commercially available. As in the prior circuit the envelope detector 78 is connected to the output of the amplifier 76 and a DC meter is connected to the output of the detector 78. A true RMS meter 84 is connected to the output of the detector 78 via a low pass filter 82 which has been inserted for the purpose of carrier suppression.

The circuit described measures the PTJ by comparing the power content in the fourth harmonic of the detected pulse train with that in its associated jitter. The circuit has a variable bandwith of 200 to 10,000 Hz. and a noise factor of 11 db when fed from the 50 ohm source. The PTJ can be found by again taking the square of the ratio of the RMS meter reading to the DC meter reading. An appropriate correction factor must be used where the envelope detector 78 is not 100 percent efficient.

In general, in order to give equal emphasis for each type of jitter of an RF pulse train the first detector should be operated in the linear region. In assigning a jitter specification to a pulsed RF source, the pulse width and the nominal repetition rate should generally be given. For many pulse sources encountered in practice, the PTJ due to amplitude jitter will be essentially constant over a fairly large range of pulse widths (a factor of 2 or 3) while the PTJ due to leading-edge jitter will be inversely proportional to the pulse width. Thus once PTJ is measured for a given pulse width, its value at a number of other pulse widths can be estimated to reasonable accuracy.

Generally a complete evaluation of PTJ entails four measurements: A measurement of the total PTJ as well as measurements of PTJ due to each type of jitter. (Of course, in the special case where the correlations among the three types of jitter are known, any three measurements are sufficient.) Any one of the three types of jitter can be easily measured by suppressing the other two for measurement purposes, by means of conventional techniques. For example, repetition rate jitter may be suppressed by tying the repetition-rate control circuit to a very stable source such as a crystal oscillator; pulse height jitter may be suppressed by clipping the pulse at a convenient level; and, in the case where pulse-width jitter manifests itself as jitter of the leading edge, it may be suppresed by stretching the pulse width so as to make its effect negligible.

An advantage in using the disclosed technique for measuring pulse-train jitter lies in the relative simplicity with whitch it can be instrumented.

We wish it to be understood that we do not desire to be limited to the exact details of construction shown and described, for obvious modifications will occur to a person skilled in the art.

We claim as our invention:

1. A system for measuring pulse-train jitter comprising:
   (a) input signal means;
   (b) filter means to receive the input signal and to pass only one harmonic of the input signal and its associated jitter;
   (c) an envelope detector connected to the output of the filter means;
   (d) a first measuring means connected to the output of the envelope detector to measure the power of the AM side bands associated with the filtered harmonic;
   (e) a second measuring means connected to the output of the envelope detector to measure the total power of the filtered harmonic.

2. The system of claim 1 wherein the first measuring means is a true RMS meter.

3. The system of claim 2 wherein the second measuring means is a true DC meter.

4. The system of claim 3 wherein the circuit includes an amplifier connected between the filter means and the envelope detector.

5. A method of measuring pulse-train jitter comprising the steps of:
   (a) selecting a harmonic from an input signal;
   (b) extracting the AM side bands associated with the filtered harmonic;
   (c) measuring the power in the AM side bands that are associated with the selected harmonic;
   (d) measuring the power of the selected harmonic;
   (e) taking the ratio of the power in the AM side bands to the power of the harmonic.

6. The method of claim 5 wherein the selected signal is amplified before the power in the AM side bands is extracted from the signal.

7. The method of claim 6 wherein the input signal is a video signal.

References Cited

UNITED STATES PATENTS 2,785,377   3/1957   MacFee et al.
2,807,798   9/1957   Dunnington.

RUDOLPH V. ROLINEC, Primary Examiner

P. F. WILLE, Assistant Examiner